United States Patent [19]

Davis-Cannon et al.

[11] Patent Number: 5,739,479
[45] Date of Patent: Apr. 14, 1998

[54] GENTLE-BEVEL FLAT ACOUSTIC WAVE TOUCH SENSOR

[75] Inventors: Marcia M. Davis-Cannon, Mountain View; Robert De Renzi, Pleasanton; Paulo Irulegui Gomes, Santa Cruz; Joel Christopher Kent, Fremont; Michael LeRoy Lewis, Oakland; Michelle Ocampo, Fremont; Daniel H. Scharff, San Lenadro, all of Calif.

[73] Assignee: ELO TouchSystems, Inc., Fremont, Calif.

[21] Appl. No.: 610,260

[22] Filed: Mar. 4, 1996

[51] Int. Cl.⁶ .................. G08C 21/00; G09G 3/02
[52] U.S. Cl. .................. 178/19; 178/18; 345/177
[58] Field of Search ............ 178/18, 19; 345/173, 345/177; 367/907

[56] References Cited

U.S. PATENT DOCUMENTS

| | | |
|---|---|---|
| Re. 33,151 | 1/1990 | Adler . |
| 3,673,327 | 6/1972 | Johnson et al. . |
| 4,642,423 | 2/1987 | Adler . |
| 4,644,100 | 2/1987 | Brenner et al. . |
| 4,645,870 | 2/1987 | Adler . |
| 4,700,176 | 10/1987 | Adler . |
| 4,746,914 | 5/1988 | Adler . |
| 4,791,416 | 12/1988 | Adler . |
| 5,072,427 | 12/1991 | Knowles . |
| 5,161,126 | 11/1992 | Marcus .................. 367/907 |
| 5,162,618 | 11/1992 | Knowles . |
| 5,177,327 | 1/1993 | Knowles . |
| 5,243,148 | 9/1993 | Knowles . |
| 5,260,521 | 11/1993 | Knowles . |
| 5,329,070 | 7/1994 | Knowles . |
| 5,380,959 | 1/1995 | Knowles .................. 345/177 |
| 5,451,723 | 9/1995 | Huang et al. .................. 178/18 |
| 5,573,077 | 11/1996 | Knowles .................. 178/19 |
| 5,591,945 | 1/1997 | Kent .................. 367/907 |

*Primary Examiner*—Curtis Kuntz
*Assistant Examiner*—Vijay Shankar
*Attorney, Agent, or Firm*—Furgang & Milde, LLP

[57] ABSTRACT

An acoustic wave touch sensor comprising an acoustic wave transducer, for transducing an acoustic wave; a substrate, having a front surface. A surface bound acoustic wave interface, having at one least bevel edge, is provided, having an transmitted acoustic wave signal attenuation of less than about 3 dB. The acoustic wave transducer is mounted to transmit the acoustic wave through the interface into the substrate, so that the energy of the acoustic wave appears at the surface. The acoustic wave transducer is mounted on a beveled region of the substrate, inclined to the front surface. The beveled edge has an effective radius which is small as compared to the wavelength and a bevel angle such that the acoustic wave is attenuated by less than about 3 dB on transmission across the edge. In this manner, means are provided to recess transducers for improved product robustness and compactness of design.

48 Claims, 4 Drawing Sheets

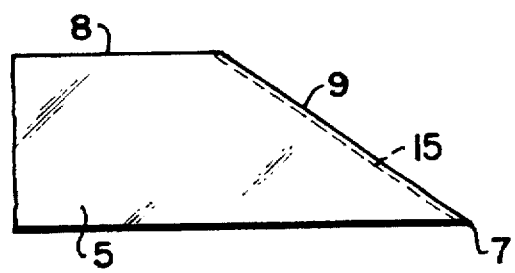
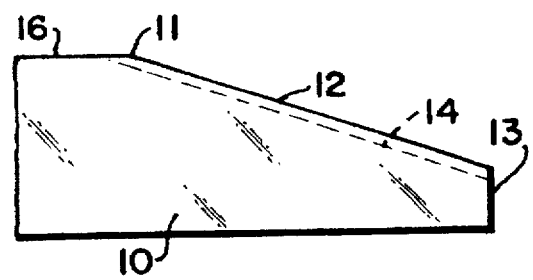
FIG.4A
PRIOR ART
FIG.4B
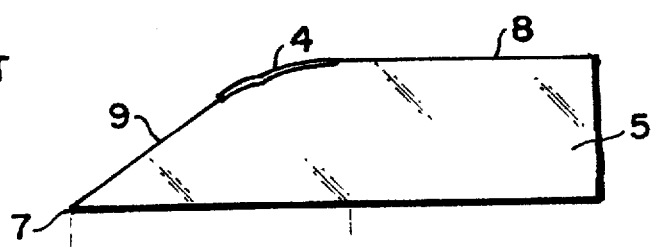
FIG.5A
PRIOR ART
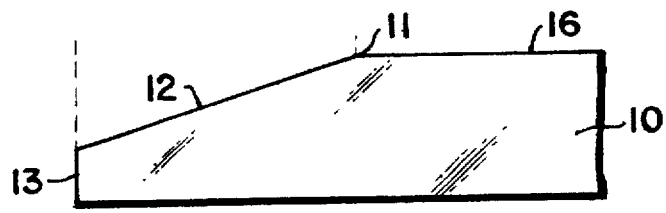
FIG.5B
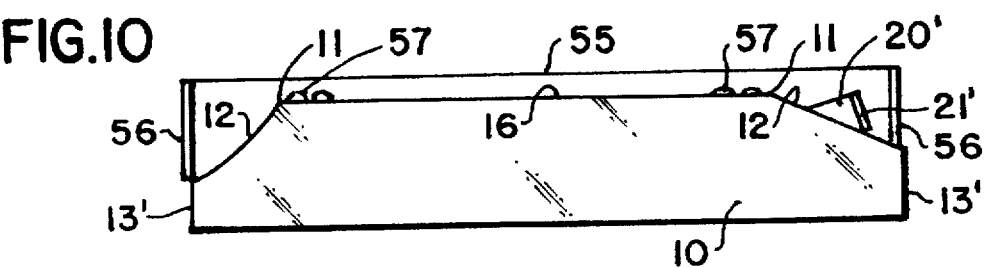
FIG.10

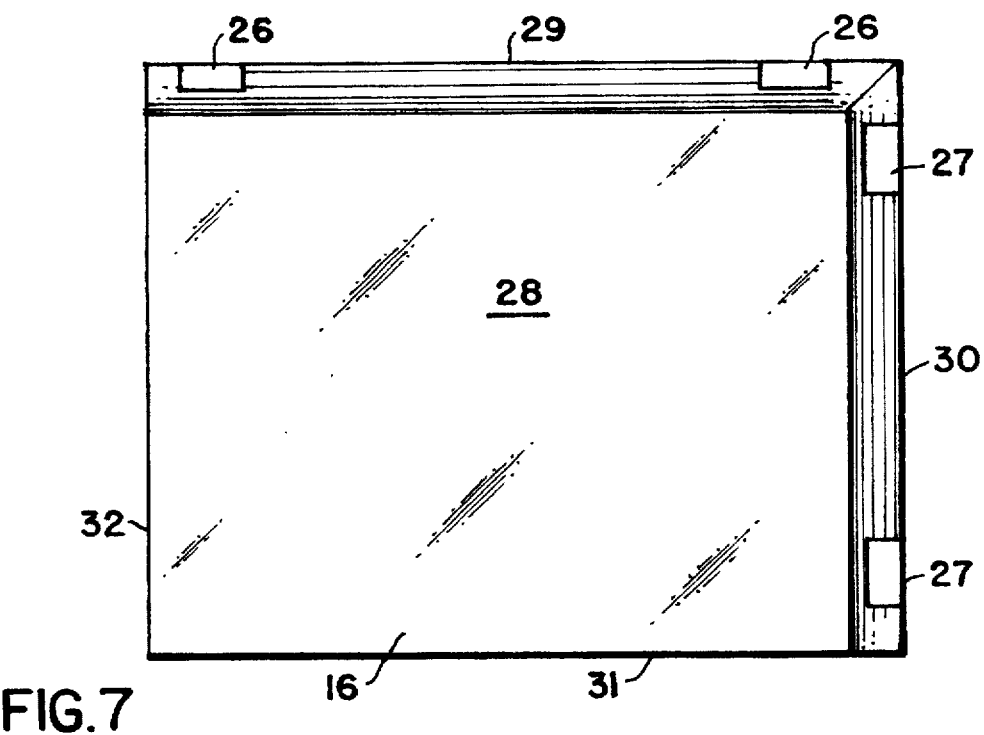
FIG.7
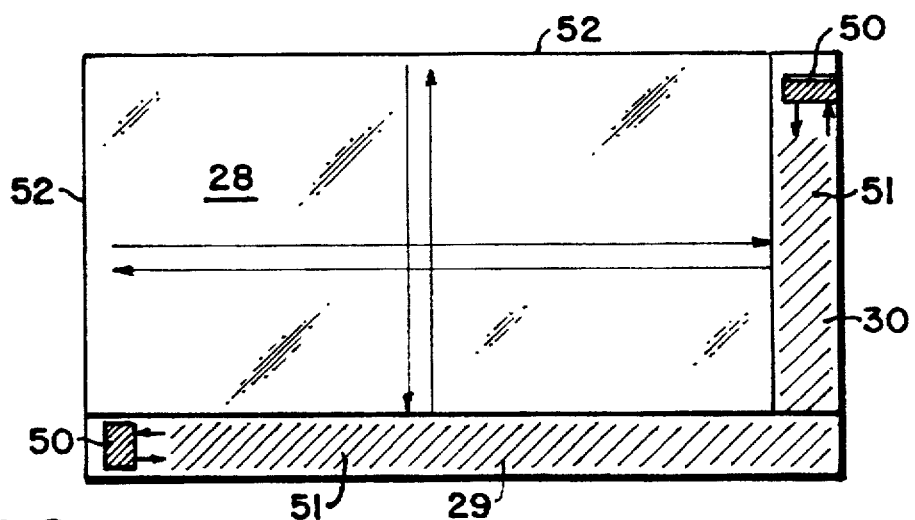
FIG.8
$$R \approx a\,\theta e^{i\phi_x}$$
$$T \approx \sqrt{1 - (a\theta)^2}\, e^{i\phi_r}$$
FIG.9

GENTLE-BEVEL FLAT ACOUSTIC WAVE TOUCH SENSOR

FIELD OF THE INVENTION

The present invention relates the field of acoustic wave touch sensors, and more particularly to the field of acoustic wave touchscreens for use as computer input devices.

BACKGROUND OF THE INVENTION

Acoustic touchscreen systems are used as computer input devices, especially as absolute touch position detecting systems for use in front of computer displays. Such devices have excellent much position reconstruction and further are advantageous due to availability of various acceptable substrate materials, including glass, which provides both durability and optical clarity. The substrate may be planar, or conform to another shape. Thus, acoustic touchscreens may employ curved glass substrates, providing a constant touchscreen to cathode ray tube (CRT) spacing where a curved glass CRT is employed.

A number of flat panel display technologies are also of growing importance, such as active-matrix liquid-crystal displays (AMLCDs); other liquid-crystal display (LCD) technologies; electroluminescent (EL) displays; plasma displays; and field-effect displays (FEDs).

The substrate material for an acoustic touch sensor may be glass, e.g., soda-lime glass or borosilicate glass. However, other known materials may be used where mechanical and optical properties are suitable, such as aluminum, ceramic. Of course, for use as a pointing device input in conjunction with a graphic user interface, the touchscreen is preferably transparent and superimposed in front of the interface image.

In many such applications involving flat panel displays, a compact mechanical sensor design is desired to allow efficient and aesthetically appealing enclosures. Transducers used with traditional acoustic touchscreens, however, pose a particular mechanical design challenge in this regard. Known acoustic transducer types include wedge and edge transducers; for example, see FIGS. 2A through 2D of U.S. Pat. No. 5,162,618.

Known systems have therefore sought to provide the transducer reoriented or displaced from the top surface of the substrate, for increased mechanical clearance and protection of the brittle transducer components. One method provides a sharp bevel angle, e.g. with a 33° bevel slope, near a lateral edge of the substrate, on which a transducer wedge is applied. These systems are subject to acoustic effects when an acoustic wave crosses the interface between the touch surface of a substrate and a bounding beveled surface. These known systems employ quasi-Rayleigh waves, a type of "surface bound wave".

A surface bound wave includes the classes of quasi-Rayleigh waves, Love waves and other waves in which the opposing substrate surface does not significantly affect the waves' motion. In contrast, Lamb waves and other plate waves involve the boundary condition on the opposing face, and therefore operate according to different principles across a beveled interface than surface bound waves. In appropriate circumstances, both surface bound waves and other waves may be surface acoustic waves. Here we define "surface acoustic waves" as acoustic waves with sufficient power density at the surface to detect a touch.

For example, FIG. 1 shows a typical known wedge transducer, which includes mechanical elements 2, 3 extending forward of the front surface 8 of the substrate 1. These known wedge transducers 2, 3 are advantageous because they provide a relatively high coupling efficiency, highly directional coupling, and low coupling to parasitic acoustic modes. Coupling wedges 2 are typically made of plastic, and mounted to a glass plate substrate 1. The transducer 2, 3, which is generally a piezoelectric element 3 with electrodes covering the two large area opposing faces, is bonded to the plastic wedge 2, and the piezoelectric element 3 with wedge 2 is then bonded to the glass touch plate substrate 1, with the piezoelectric element electrodes electrically connected to the electrical circuitry. In a wedge transducer 2, 3, the piezoelectric element 3 vibrates to produce a compressional bulk wave that propagates in the wedge 2, which in turn is transduced through the wedge 2-substrate 1 interface to impart a quasi-Raleigh wave.

For most acoustic touchscreens presently manufactured, the wedge 2 extends above the surface 8 of the plate, and therefore the rear or inactive side of the substrate and its edges remain free of circuitry or critical elements. However, the wedge 2 and transducer 3 assembly may interfere with structures in front of the touchscreen; this is often the case in which an acoustic sensor is used with a flat panel display. Furthermore, the brittle piezoelectric element 3 is relatively exposed and subject to breakage during handling and touch/display system assembly; this issue is particularly important for heavy substrates such as the approximately ½ inch thick glass used in Elo TouchSystems' SecureTouch™ products.

One known solution to this forward extension problem is shown in FIGS. 2 and 3. Here the forward extension problem is addressed by beveling the glass substrate 5 with an angled bevel 9 so that the acoustic transducer 2, 3 does not extend forward of the substrate front surface 8 to any great extent.

The motivation for this type of beveling was to recess the transducer on an angled surface behind the front glass surface. Thus, the bevel angle was large, and the bevel itself extended to the lateral edge of the substrate.

Such products include certain prior art Elo Touchsystems, Inc. P/N 002800A-8121 (33°) and 002801A-8121 (33°), shown in FIG. 3. These known systems have a bevel angle of about 33°, and were designed with a radiused blending region 4 which is provided to limit acoustic losses from the beveled interface.

The beveled glass design shown in FIG. 3 proved to be difficult to manufacture. Grinding the four individual corner regions is a costly labor intensive process. In an effort to address these problems, prior art touchscreens were also produced with continuous 25° bevels on the two sides with transducers. Continuous beveling is a known process which allows automation and requires less manual labor than selectively beveling a portion of an edge. The resulting manufacturing process is more widely available. These known continuous bevels allow protected routing of transducer wires. However, the resulting touchscreens retained at least two drawbacks.

As shown in FIG. 2, the known beveling process produces a "knife edge" 7. For the glass substrate, this resulted in a sharp edge that was inconvenient to handle and subject to chipping. This becomes more of an problem for a continuous bevel. Efforts to blunt this knife edge with, e.g., an intended 0.020±0.010 inch vertical edge, resulted in chipping flaws along the edge, as well as true knife edge portions due to excess manufacturing variations, which serve as nucleation sites for glass fracture in an oven processing step. Secondly, the brittle piezoelectric element 3 of these known 25° angle bevel systems can not fit within the confines of the beveled portion, and thus protrudes either forward or laterally from the substrate. This leads to mechanical clearance problems or transducer breakage risk.

Both examples of prior art described above share a further disadvantage. These known designs include a gently curved or blended interface 4 between the bevel surface 9 and the top surface 8 of the glass substrate 1. This rounding is motivated by acoustic reasons; without this rounding, the prior art teaches that a significant amount of acoustic power is lost, attributed to reflections and mode conversion at the discontinuity. Ideally, with rounding, surface acoustic waves travel across the interface with minimal reflection, much like ocean waves travel across the rounded globe without reflection. However, approximating this ideal is problematic, increasing the cost and labor required for manufacture, and resulting in deficiencies in acoustic property reproducibility. The blending of the bevel and top-surface interface adds cost to the manufacturing process and limits mass production capacity.

Examples are also known without blending at interface 4, resulting in a substantial loss of signal amplitude for the aforementioned 25° and 33° embodiments. This is undesirable. It may directly result in reduced touch sensitivity of the touchscreen. Alternately it may reduce the level of electromagnetic interference that the touch system can tolerate, or the degree of signal loss due to aging effects that can be endured. Signal amplitude is a measure of touchscreen quality. Without blending at interface 4, the resulting product is of reduced quality.

While available commercial acoustic touchscreen products employ wedge or edge transducers bonded directly to the substrate containing the front touch surface, a number of proposals have been made to separate the transducer from the touch surface. FIGS. 15 and 16 of U.S. Pat. Nos. 5,177,327, 5,243,148, 5,260,521, and 5,329,070 and FIGS. 12 and 13 of U.S. Pat. No. 5,072,427 propose means to place an edge transducer remote from the glass substrate with the aid of a connecting metal acoustic coupling element. These proposals, however, do not address the extent of acoustic losses due to the remote placement of the sensor, nor define acceptable limits.

Adler, U.S. Pat. No. 4,642,423 discloses a transducer displaced from the substrate, mounted on an aluminum coupling element. A transducer generates a wave which propagates in a metal element having the reflective grating and a feathered edge, bonded to the top surface of the glass substrate. The acoustic wave transfers to the glass substrate. Adler teaches that care must be taken to ensure an efficient transition of the waves from the reflective grating onto the surface, proposing a feathered, or beveled, edge, near the wave transference portion.

Acoustic touch position sensors are known to include a touch panel or plate having an array of transmitters positioned along a first edge of a substrate for simultaneously generating parallel surface acoustic waves that directionally propagate through the panel to a corresponding array of detectors positioned opposite the first array on a second edge of the substrate. Another pair of arrays is provided at right angles to the first set. Touching the panel at a point causes an attenuation of the waves passing through the point of touch, thus allowing an output from the two sets of arrays indicative of the coordinates of the touch. This type of acoustic touch position sensor is shown in U.S. Pat. No. 3,673,327, incorporated herein by reference.

The substrate, in many embodiments, is preferred to be transparent because this allows efficient and effective use of the touch sensor as a panel placed in front of a visual display device, such as a cathode ray tube, electroluminescent display, or liquid crystal display. Glass substrates are therefore preferred, such as soda-lime glass or a lower acoustic loss glass such as borosilicate glass. In other applications, such as where a graphic overlay may be provided on a touch surface, ceramic or metals such as aluminum may be used as the substrate.

Acoustic touch position sensors are also known wherein a single transducer or pair of transducers 6 per axis is provided, which produces a surface acoustic wave which is reflected, by a reflective grating 40 having elements set at 45° to the beam, at right angles over the length of the grating to produce a surface acoustic wave pattern propagating through an active area of the substrate. The position of a touch in the active area is determined by, e.g., reflecting the waves back to the originating transducer or providing an opposing reflective grating 40 which directs the surface acoustic wave pattern along an axis of the grating toward a receiving transducer system 6, which records the time of arrival of an attenuation of the wave pattern, which corresponds to a position along the axis of the arrays. The touch, in this case, may include a finger or stylus, perhaps indirectly through a cover sheet, pressing against the surface. Other types of configurations for collecting the sensing signal are also known.

The reflective array 40 is formed of acoustically partially reflective structures, which may be an inscribed or raised surface feature, or a feature having differing wave propagation characteristics which forms a partial barrier. These structural elements may, in theory, be formed on any portion of the substrate where there is a significant wave energy. Thus, if a wave has surface energy, surface features may be used. If wave energy is completely buried, then these barriers must intrude into the material of the substrate. Thus, for waves having surface energy, these reflecting arrays may be formed on the surface, and where wave energy is present on both sides of the substrate, these reflecting arrays may be formed on one or both sides of the substrate. Because the touch sensor is generally placed in front of a display device, and the reflective array is not generally optically invisible, the reflective arrays are generally placed at the periphery of the substrate, outside of the active sensing area, and are hidden and protected under a bezel.

The wave pattern of known acoustic touch sensors is dispersed along the axis of the transmitting reflective array, traverses the substrate and is recombined, e.g., into an axially propagating wave, dispersed in time according to the path taken across the substrate, by another reflective grating, and is directed to a receiving transducer in a direction antiparallel to the transmitted wave, which receives the wave and converts it into an electrical signal for processing. Thus, according to this system, two transducers per axis are required. Because of the antiparallel path, the time delay of a perturbation of the electrical signal corresponds to a distance traveled by the wave, which in turn is related to the axial distance from the transducer along the reflecting arrays traveled by the wave before entering the active area of the substrate. The location of touch is determined by detecting an attenuated signal as compared to a standard received waveform. Thus, for each axis, a distance may be determined, and with two orthogonal axes, a unique coordinate for the attenuation determined. Acoustic touch position sensors of this are shown in U.S. Pat. Nos. 4,642,423, 4,644,100, 4,645,870, 4,700,176, 4,746,914, 4,791,416 and Re. 33,151, incorporated herein by reference.

For each axis, a standard signal is provided to the transducer by interfacing a piezoelectric transducer with the sheet-like substrate, outside the active area, to produce a wave, propagating along an axis. For example, quasi-Rayleigh waves are generally coupled through the surface portion of the substrate, on the side which is intended to be touch sensitive. The reflective array in the path of the wave, for redirecting the wave into the touch sensitive region, includes a series of spaced surface interruptions, having a separation distance of an integral number of wavelengths of the wave produced by the transmitting transducer, angled 45° to the axis, i.e., the direction of wave propagation. The reflective array thus produces a reflected surface acoustic wave propagating at 90° to the original angle of transmission, through the active area of the substrate.

Where the wave energy in a substrate is in the form of surface bound waves, the rear surface is insensitive to touch and mounting apparatus.

To receive the sensing wave, it is generally considered desirable to provide a single transducer for transducing the wave into an electrical signal in which the touch position is encoded by temporal fluctuations in the signal. While a transducer extending the full length of the substrate could be provided, this requires a large transducer. Instead, the art teaches an inverse of the transmission technique, multiplexing the sensing wave into an acoustic wave directed toward a small receiving transducer. Thus, in an area outside the active area, the waves are again reflected by an otherwise identical reflecting array having spaced interruptions at a mirror image angle, thereby multiplexing the spatially dispersed signal into a single waveform pattern, propagating antiparallel to the transmitted surface acoustic wave, which is detected by another transducer. Known systems, have employed excitation frequencies of 5.0 and 5.5 Mhz. The thickness of the sheet-like member, if used to propagate quasi-Rayleigh waves is typically in the range from 0.09 inches to 0.125 inches. A known zero order horizontally polarized shear wave touch sensor employs a substrate having a thickness of about 0.040 inches.

The art also teaches the use of a single transducer for both transmitting the wave and receiving the sensing wave, with a single reflective array employed to disperse and recombine the wave. Such systems therefore employ a reflective edge opposite the reflective array. As a result, the surface wave passes through the active region twice, with consequent increased wave absorption by the touch but also increased overall signal attenuation due to the reflection and additional pass through the active region of the substrate. For example, a quasi-Rayleigh wave may be reflected off an edge of the substrate parallel to the axis of the transmission reflective grating and reflected by half-wavelength spaced reflectors back through the substrate to the reflective array and retrace its path back to the transducer. The transducer, in this case, is configured to act as both transmitter and receiver at appropriate time periods. A second transducer, reflective array and reflective edge are provided for an axis at right angles to allow determination of the orthogonal touch coordinate.

A related system provides for a single transducer which produces a sensing wave for detecting touch on two axes, which both produces the acoustic wave and also receives the wave from both axes. In this case, the area in which touch is to be sensed is generally oblong, such that the longest characteristic along one path is shorter than the shortest characteristic delay along the second path.

Adler, U.S. Re. 33,151, incorporated herein by reference, relates to a touch-sensitive system for determining a position of a touch along an axis on a surface. An acoustic wave generator is coupled to a sheet-like substrate to generate a burst of waves, which are deflected into an active region of the system by an array of wave redirecting gratings. Surface waves traversing the active region are in turn redirected along an axis by gratings to an output transducer. The redirecting gratings are oriented at 45° to the axis of propagation. A location of touch is determined by analyzing a selective attenuation of the received waveform in the time domain, each characteristic delay corresponding to a locus on the surface. The grating elements are placed at a 45° angle and spaced at integral multiples of the acoustic wavelength with dropped elements to produce an approximately constant surface wave power density over the active area. Thus the spacing between grates decreases with increasing distance along the axis of propagation from the transducer, with a minimum spacing of one wavelength of the transmitted wave. U.S. Pat. No. 4,746,914 also teaches use of reflecting elements which vary in height to control a ratio of reflected wave power to unreflected wave power.

Brenner et al., U.S. Pat. No. 4,644,100 relates to a touch sensitive system employing surface acoustic waves, responsive to both the location and magnitude of a perturbation of the surface waves, determining an amplitude of a received wave and comparing it to a stored reference profile.

SUMMARY AND OBJECTS OF THE INVENTION

The present invention provides a method for mounting an acoustic transducer to a substrate and a resulting mounted transducer system, in which the transducer is mounted, separated from a perturbation sensitive portion of the substrate, by an abrupt bevel, thus increasing the mounting options for the transducer. By providing an acceptable bevel, the location of the transducer, including its mounting structure, may be significantly relocated from a plane of a touch sensitive surface, with signal attenuation controlled, and a minimum area lost.

The prior art address the transducer mounting clearance problem in two notable fashions. First, a relatively sharp bevel angle, e.g., one which would otherwise produce unacceptable signal losses, is provided with a blended bevel region, thus avoiding a sharp discontinuity. This structure generally results in a substantial region of the substrate occupied with the blending. Second, a moderate bevel angle, producing marginally unacceptable signal losses, is provided with a sharp bevel edge. This structure, however, results in a substrate having a sharp, brittle lateral edge.

According to the one aspect of the present invention, having a positive angle bevel for recessed mounting of the transducer behind the front face of a touchscreen, two technical features may be provided:

avoidance of a knife-edge at a beveled substrate edge; and providing a gentle unblended bevel angle, having a low transmission loss.

Preferably, a continuous bevel is provided on the substrate edge.

It is therefore an object of the present invention to provide an acoustic wave touch sensor comprising a substrate, having a front surface, and a bevel having a surface sloping at an angle with respect to the front surface, forming an edge with the front surface; and an acoustic wave transducer, mounted to the substrate to transduce an acoustic wave, having a wavelength and traveling in the substrate, the edge having an effective radius which is small as compared to the wavelength and a bevel angle being selected such that the acoustic wave is attenuated by less than about 3 dB on transmission across the edge. The bevel of a monolithic substrate preferably has an angle less than 25° with respect to the front surface, and more preferably has an angle of about 16° with respect to the front surface.

It is therefore also an object according to the present invention to provide an acoustic wave touch sensor comprising an acoustic wave transducer, for transducing an acoustic wave; a substrate, having a front surface, and an acoustic wave interface, the interface having at least one abrupt acoustic impedance mismatch, the interface having an transmitted acoustic wave signal attenuation of less than about 3 dB; the acoustic wave transducer being mounted to transduce the acoustic wave through the interface into the substrate, so that energy of the acoustic wave appears at the surface; wherein the interface comprises a region for mounting the acoustic wave transducer which is displaced or inclined from the front surface. In one embodiment, the interface comprises a beveled edge. The beveled edge may be provided having an effective radius which is small as compared to the wavelength and a bevel angle such that the acoustic wave is attenuated by less than about 3 dB on transmission across the edge.

It is also an object according to the present invention to provide an acoustic wave touch sensor having an interface comprising a pair of edges, spaced to cause destructive interference of a reflected portion of the acoustic wave, the pair of edges each having an effective radius which is small as compared to the wavelength and bevel angles such that the acoustic wave is attenuated by less than about 3 dB on transmission across the pair of edges.

It is another object according to the present invention to provide an acoustic sensor wherein the substrate comprises a plurality of edges, each of the edges being spaced to produce reflections which sum to effectively destructively interfere, the plurality of edges each having an effective radius which is small as compared to the wavelength and bevel angles such that the acoustic wave is attenuated by less than about 3 dB on transmission across the plurality of edges.

It is a further object according to the present invention to provide an acoustic sensor, wherein the substrate comprises a plurality of edges, a net attenuation of the acoustic wave across the plurality of edges being less than an acoustic loss across an edge having a largest attenuation loss.

According to one aspect of the invention, the acoustic wave transducer comprises a piezoelectric element mounted on a wedge, the acoustic wave being a quasi-Rayleigh wave. The substrate may be formed of glass, e.g., soda lime glass or a low loss glass such as borosilicate glass.

In another aspect of the invention, the front surface has a perimeter edge having a length, the bevel being approximately parallel to and approximately the same length as the perimeter edge. Therefore, an electrical wire connected to the transducer, disposed adjacent to the bevel, may lie flat without interference of structures in front of the front surface. Advantageously, the transducer is disposed on the bevel, totally or partially behind the front surface. Also, advantageously, in the plan view, the transducer may be disposed on the bevel totally within the outer boundary of the substrate.

According to one aspect of the invention, a reflective array is provided, the reflective array redirecting portions of the acoustic wave across the front surface. Both the reflective array and the transducer may be disposed on the bevel, the array redirecting portions of the acoustic wave across the bevel edge to the front surface. Alternatively, the transducer may be disposed on the bevel, the reflecting array being disposed on the front surface and redirecting portions of the acoustic wave across the front surface.

According to an aspect of the present invention, a touch on the front surface perturbs the acoustic wave, and the same or a different transducer may receive the perturbed acoustic wave to sense a touch characteristic.

A coversheet may be provided, parallel to the front surface, fastened in proximity to the bevel, to protect the surface or modify the acoustic properties of a touch. The mounting for the coversheet, however, need not have a physical attachment to the substrate.

The bevel preferably has a lateral aspect which as adapted to resist fracture, within the constraints imposed. In brittle substrates, a susceptibility to fracture may be considered related to a minimum thickness and aspect ratio, especially near a free edge. Thus, for glass and other brittle substrates, a knife edge, with a resulting long, thin free edge, is avoided, and therefore such substrates preferably have lateral edges with a substantial thickness with respect to the substrate. An outer edge surface may be provided, the bevel being formed between the outer edge surface and the front surface, the outer edge surface being substantially perpendicular to the front surface. Preferably, this lateral edge has a thickness of at least about 0.030±0.010 inch. In another embodiment, a lateral wall of the bevel is provided, the lateral wall, with the bevel, forming a trench in the substrate. This avoids a free edge. Such a trench provides allows recessing of the wiring as well as the transducer itself.

According to a further embodiment, the acoustic wave transducer comprises an electro-acoustic device mounted to the beveled portion of the substrate, the acoustic wave transducer emitting either a surface bound wave which crosses the bevel edge, or, an acoustic wave that is reflected or mode converted by a reflective array into a surface bound wave which crosses the bevel edge to the front surface.

According to a still further object of the invention, the front surface is non-planar, and may be cylindrical, spherical, ellipsoidal or other shape.

Further objects will become apparent through a review of the detailed description and drawings.

BRIEF DESCRIPTION OF THE DRAWINGS

These and other features in accordance with the invention are illustrated, by way of example, in specific embodiments of the invention now to be described with reference to the accompanying drawings, in which:

FIGS. 4A and 4B are cross sectional views of a prior art beveled edge and a beveled portion according to the present invention, showing an effect of a width tolerance of the substrate;

FIGS. 5A and 5B show cross sectional views of a prior art beveled edge with a blended radius and a non-blended beveled edge according to the present invention, showing a planar transducer mounting region;

FIG. 7 shows a plan view of a continuous bevel substrate with mounted transducers transmitting across the bevel edge according to the present invention;

FIG. 8 shows a plan view of a continuous bevel substrate with mounted transducers transmitting parallel to the bevel edge according to the present invention;

FIG. 9 shows a representation of the amplitude for reflected and transmitted waves by an edge interface with angle θ; and FIG. 10 shows a cross sectional view of a beveled substrate with a cover sheet according to the present invention.

DETAILED DESCRIPTION OF THE PREFERRED EMBODIMENTS

Figure 1:
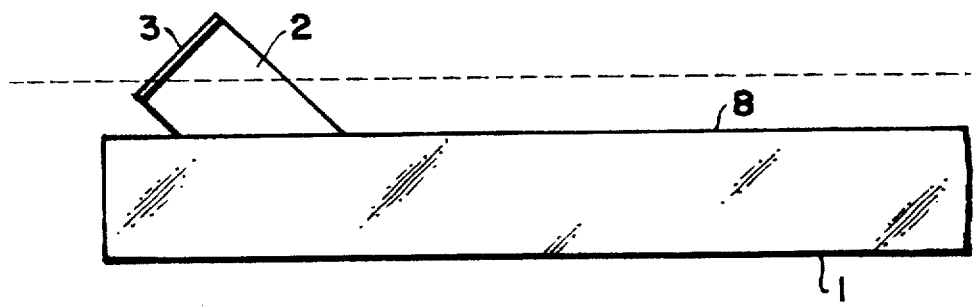
FIG. 1 is a cross sectional view of a prior art surface acoustic wave touch sensor.

The preferred embodiments will now be described with respect to the Figures, in which corresponding reference numerals relate to corresponding structures.

Continuous Bevel on Substrate Edge

The bevel 29, 30 preferably extends the entire length of each side containing the mounted transducers 26, 27, as shown in FIG. 7. This provides a lower manufacturing cost, due to mass production capability, when compared to individually and selectively beveled substrates 5 of the prior art.

In addition to a cost advantage, the continuous bevel 29, 30 also allows for placement of wiring to and from the transducers on the bevel surface. This reduces susceptibility to wire damage relative to wire muting on the glass edge or top surface.

Figure 6A:
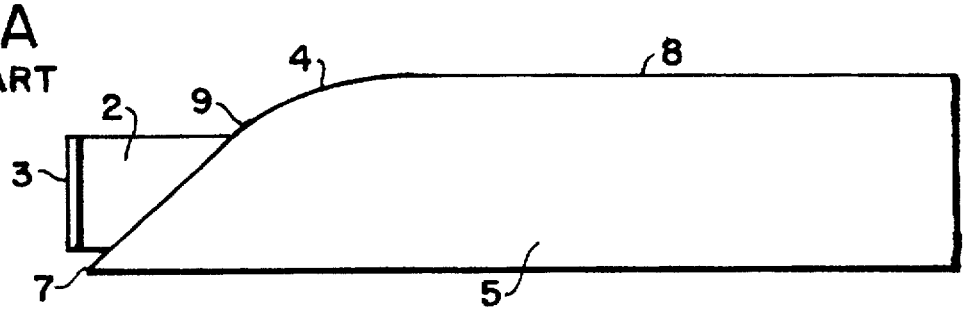
FIGS. 6A, 6B, 6C and 6D show cross sectional views of mounted transducer wedge assemblies for prior art, a first embodiment according to the present invention, a second embodiment according to the present invention, and a third embodiment according to the present invention.
Figure 6B:
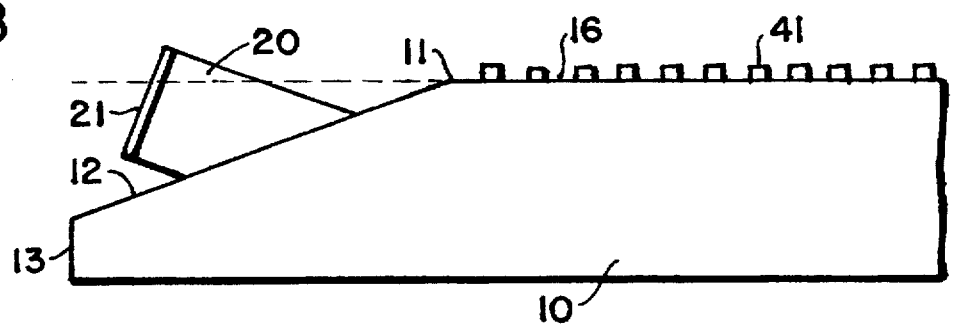
Figure 6C:
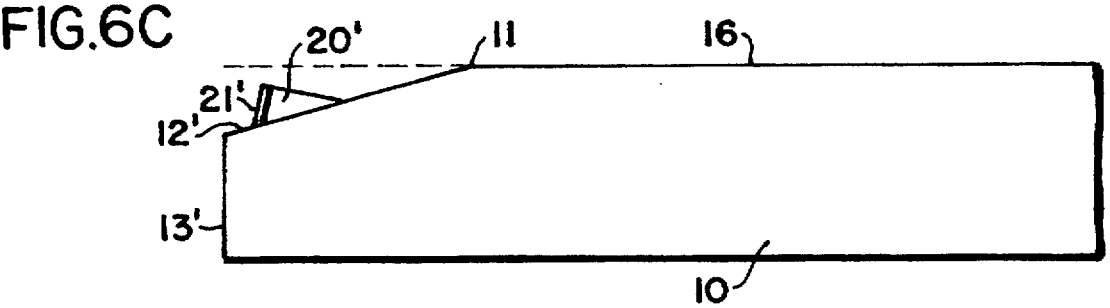

The transducer 20, 21 may be situated to direct an acoustic beam directly at the beveled edge, as shown in FIGS. 6B and 6C, with a reflective array 41 formed on the touch surface of the substrate. The transducer 20, 21 may also direct an acoustic beam parallel to the bevel 29, 30, with the reflective arrays 51 formed on the bevel 29, 30 and redirecting rays across the bevel edge 11 and onto the touch surface 16, as shown in FIG. 8. In each case, the acoustic wave traverses the edge. Of course, known methods of redirecting the waves back toward the emitting transducer, or alternatively towards a separate receiving transducer on a beveled surface, may be employed, which would cause the waves to traverse the edge multiple times. Because of the defined limited angle bevel according to the present invention, which in this example is a gentle angle, less than 25°, the signals losses are reduced without recourse to costly manufacturing processes.

Alternatively, the transducer may be aimed at a corresponding transducer on an opposing edge of the substrate, to directly detect an attenuation of the acoustic wave due to a touch. See U.S. Pat. No. 3,673,327, incorporated herein by reference. Depending on the application, one or more of the substrate edges is provided with a continuous bevel.

The continuous bevel 29, 30 may also be advantageously employed to recess the transducer 20, 21 behind a coversheet 55 and to properly locate the coversheet. See FIG. 10. For example, the bevel 12 may be advantageously employed as a mesa structure to decrease a distance between the coversheet 55 and the touch surface 16, while simultaneously facilitating coversheet attachment by a mechanical system 56 extending behind the front surface 16 of the substrate. Advantageously, the bevel 12 additionally allows the transducer 20, 21 to be located behind the front surface of the substrate, allowing an arbitrarily small gap between the coversheet and the touch sensitive surface without mechanical interference from the transducers. Spacing elements may be used to assure a minimum spacing.

The ability to reduce transducer breakage during handling and installation by recessing the transducer is particularly advantageous for touchscreen designs utilizing more massive substrates. For example, Elo TouchSystems' SecureTouch™ products address market demand for more robust touch system solutions by using glass substrates of approximately 0.5" thickness. The substrate can be annealed glass, tempered or chemically hardened glass, or laminated (safety) glass. In all cases, the resulting touchscreen is more massive, resulting in potentially greater forces on transducers from accidental impacts. The ability to cost-effectively recess transducers without significant signal loss is of significant benefit. The scope of the present invention thus includes touchscreens comprising such thick substrates.

Avoidance of Knife-Edge

In contrast to certain prior beveled glass substrate designs, the present invention avoids a knife edge 7 at the lateral aspects of the substrate, as shown in FIGS. 2, 4A, 5A and 6A of the prior art, as compared to FIGS. 4B, 5B, 6B, 6C, and 6D of the present invention, which have a flat lateral-most edge surface 13, 13'. For example, a preferred embodiment includes a 0.125 inch thick glass sheet with a 16° bevel on the front surface, extending about 0.35 inches, with a minimum substrate thickness of about 0.030 inches. This 0.030 inch thick lateral edge substantially improves fracture resistance, and is easier to handle. Experience of the assignee hereof with 25° bevel angle sensors with a nominal edge thickness of 0.020±0.010 inches proved that the minimum thickness was difficult to maintain, resulting in knife edge portions, and that this free edge was subject to nicks, all of which serve as nucleation sites for glass fracture in an oven process for curing a glass frit, applied to the substrate.

A knife-edge 7 has several disadvantages relative to the present design. As shown by the dotted lines 15, 14 in FIGS. 4A and 4B, variations in the manufacturing process creating the bevel 9, 12 alter the outside dimensions of the finished product for the knife-edge 7 design, but not the present bevel design.

The sharp knife-edge 7 is more susceptible to damage in handling. The knife-edge 7 is also less safe to handle. These issues become increasingly important when the bevel is continuous along the edge.

A knife-edge 7 also provides nucleation sites for glass fractures. This is expected to lead to reduced performance with respect to, for example, a known Underwriters Laboratories ball drop test.

Further, glass-flit reflectors may be heat cured on the substrates by passing the substrates through a conveyor oven. The resulting temperature cycling stresses the glass. With continuous knife-edge 7 bevels, a significant yield loss has been observed to occur, due to glass fractures in the heat curing process, a consequence of the fracture nucleation sites inherent in a knife edge 7.

According to one aspect of the present invention, when a directional transducer is employed, the substrate behind the transducer is not an important factor in the sensor system. Therefore, the substrate need not end with the bevel 12, and may, in fact, continue. For example, the bevel 12 may be formed as a trench structure with a beveled wall, having a substrate portion which extends past the bevel 12. Such a trench may be advantageous for protecting sensor cables, the transducers themselves, or for mounting.

Gentle Bevel

Figure 2:
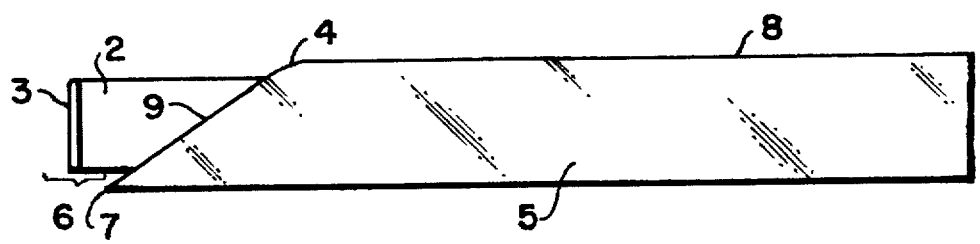
FIG. 2 is a cross sectional view of a prior art beveled edge acoustic wave touch sensor.
Figure 3:
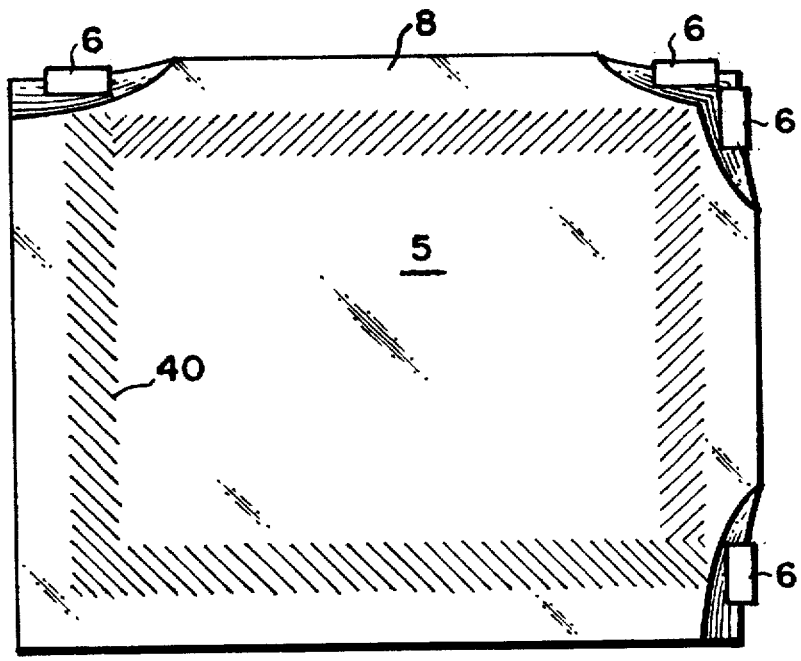
FIG. 3 is a plan view of a prior art beveled edge acoustic wave touch sensor.

The present invention, having a defined and limited angle bevel 12, eliminates the need to seam, blend, or otherwise round 4 the interface between the bevel 9 surface and the top surface 8 of the glass, as shown in FIGS. 2, 5A and 6A of the prior art as compared to 4B, 5B, 6B, 6C and 6D of the present invention. On a monolithic or homogeneous substrate with a single bevel edge, the bevel angle is gentle, and has an upper limit of less than 25°, applicable for broad classes of surface bound waves.

For a given transducer height, a reduced bevel angle may require a wider bevel to keep the transducer behind the front surface. This potential increase in substrate size due to the gentle bevel 12 angle may be compensated for by the elimination of the need for a blending region. A gentle bevel 12 angle allows low loss transmission of the acoustic signals through this interface, with no further blending, seaming or rounding of the bevel to the front surface of the substrate.

Therefore, two important advantages result from the use of a gentle bevel 12 with an unblended interface 11: first, labor, cost, and process variation associated with interface 11 rounding are eliminated; and second, the sensor design layout space required for rounded interface 4 is eliminated. This latter aspect compensates, at least in part, for the reduced bevel angle, as shown in FIGS. 5A and 5B.

In a preferred embodiment of the present invention, the vertical edge 13 is 0.030 inches in height, the beveled surface 12 is 0.350 inches wide, the substrate 10 is 0.125 inches thick soda-lime glass, and the bevel angle is 16°, continuous along an edge of a rectangular substrate.

Quantification of Limited Bevel Angle

The bevel angle is considered acceptable if signal loss from an unrounded bevel/top-surface interface (typically twice in the acoustic path from transmit to receive transducer) is sufficiently small.

Analog signal budgets for acoustic touchscreen systems are complex and vary greatly in quantitative detail for different applications. However as a rough rule of thumb, a 6 dB loss, that is a factor of two in amplitude, is typically within the analog-signal budget margin. For losses greater than 6 dB due to changes in sensor design, it becomes likely that compensating changes in other components in the analog system will be required, and therefore such losses are generally avoided. Therefore, such sufficiently small signals losses are generally less than about 6 dB for the entire acoustic path, which typically involves two beveled interfaces. Therefore, an acceptable loss across a single interface is about 3 dB.

According to tests performed by inventors hereof, a 16° bevel angle between the bevel surface and the active touch surface, for a monolithic soda lime glass substrate, results in significantly less than a 6 dB signal loss over the acoustic path. A 25° bevel angle showed a measured signal loss of about 8 dB for a signal path including two beveled interfaces. Quadratic extrapolation (see below) from 25° bevel data implies a 14 dB signal loss for a 33° bevel angle substrate over the acoustic path. Therefore, as employed herein, a bevel angle less than 25° for a monolithic glass substrate is considered acceptable, while larger angles result in higher, and undesirable signal losses. In order to gain significant advantages in mounting the transducer, with limited loss of surface to the bevel, and limited signal loss, it is preferred that the bevel angle be between about 6° and less than 25°, and more preferably between about 10° and about 20°, and most preferably about 16°.

The above data were collected at an operating frequency of 5.53 MHz. As long as the effective radius of the bevel edge remains small compared to the acoustic wavelength, scaling-law considerations allow us to apply experimental results to other operating frequencies, or equivalently wavelengths.

The above data were collected using soda-lime glass as a substrate which has a ratio of Poisson's ratio of approximately 0.26. These experimental results also apply to a good approximation to other materials with similar Poisson's ratios, such as borosilicate glass (0.24), aluminum (0.35), stainless steel (0.3). Poisson's ratio can be determined from the ratio of shear and longitudinal bulk wave velocities as follows (see, e.g., textbook by B. A. Auld):

$$\text{Poisson's ratio} = [1 - 2*(V_s/V_l)^2]/[2*(1-(V_s/V_l)^2)]$$

Materials of practical interest as touch panel substrates, including borosilicate glass, aluminum and steel, thus have Poisson's ratios similar to soda-lime glass.

The relevance of Poisson's ratio is as follows. There are three independent material properties, which along with boundary conditions, quantitatively determine the interaction of an incident acoustic wave with a bevel edge. However, by scaling with respect to size and time, or equivalently scaling wavelength and acoustic velocity of all acoustic modes simultaneously (keeping ratios of velocities fixed), there is only one independent material property that can affect the dB attenuation at the bevel edge. That parameter is Poisson's ratio, which determines the ratios of the velocities of the various acoustic modes. For a given bevel angle, assuming a sharp bevel edge, two materials with similar Poisson's ratios will have substantially the same dB transmission loss at the interface.

More mathematically, Poisson's ratio, or equivalently, the ratio of shear to longitudinal bulk-wave velocities, uniquely determines the ratio of the wave-function depth for a Rayleigh wave to the wavelength. This depth-to-wavelength ratio is the key parameter determining transmission for a given bevel angle.

Furthermore, the depth-to-wavelength ratio for Rayleigh waves in an isotropic medium varies little throughout the entire range of physically possible values of Poisson's ratio, namely zero to one-half. Calculations (based on equations in B. A. Auld's textbook on "Acoustic Fields and Waves in Solids") of the ratio of the root-mean-square depth of acoustic power, or equivalently, acoustic kinetic energy, to wavelength, as a function of Poisson's ratio, reveal that this ratio is limited to a range of 0.31 to 0.48. Soda-lime glass is approximately in the middle of this range. The depth-to-wavelength ratio for soda-lime glass thus applies, within 25%, to all isotropic media.

The transmission loss at the bevel edge is predominately due to phase incoherence in the wave-function overlap integral between incident and transmitted surface-bound waves. Polarization direction mismatch is typically a lesser effect. The degree of the phase incoherence, and hence the transmission loss, depends on the bevel angle times the effective wave-function depth divided by the wavelength. Given that the depth-to-wavelength ratio varies little between Rayleigh waves in differing isotropic media, the above experimental results for soda-lime glass generalize accordingly, and are expected to generally apply for a broad range of materials useful as acoustic touchscreen substrates.

Furthermore, for surface bound waves, other than Rayleigh waves, for which substrate design leads to a root-mean-square depth-to-wavelength ratio of less than 0.5, a bevel angle of less than 25° may also be also acceptable, in terms of signal losses. Generalizing further, a bevel angle is acceptable if it is less than 25° times half the surface bound wave wavelength divided by the root-mean-square depth of the surface bound wave's power density. For example, a lowest order Love wave whose acoustic power is strongly confined near the surface with an appropriate layered substrate structure can support a bevel angle greater than 25°.

FIG. 9 shows the reflection and transmission of an incident wave with unit amplitude by an abrupt edge 11 of angle θ. R is the amplitude of the reflected wave, and T is the amplitude of the transmitted wave. R has to be an odd function of θ, since the amplitude for the superposition of two reflected waves, one by an edge 11 of angle θ, the other by an edge 11 of angle −θ, equals zero (the amplitude of the wave reflected by an edge with θ=0). Consider the mathematical limit of zero distance between +θ and −θ edges. Thus, for small angles, R is proportional to θ. The parameters α and the phases $\phi_R$ and $\phi_T$, are real constants.

T may be calculated assuming negligible coupling to bulk waves and conservation of energy ($|R|^2+|T|^2=1$). Thus, the signal attenuation in decibels for an acoustic path crossing two edges is approximately $$\text{Attenuation[dB]} \approx 2 \times 10 \log[1 - (\alpha\theta)^2].$$

Taylor expanding the attenuation equation, gives, $$\text{Attenuation[dB]} \approx -\frac{2 \times 10}{\ln(10)} (\alpha\theta)^2 = C\theta^2.$$

which is a quadratic scaling law for small bevel angles. For larger angles, dB loss as a function of angle might not be strictly quadratic; however, attenuation remains a strongly increasing function of angle.

For clarity of presentation, possible coupling to bulk waves or other modes at the bevel edge has been neglected. However, the resulting scaling-law result remains valid. Note that the amplitudes for the generation of all parasitic modes, like the reflection amplitude, is zero if the angle is zero, is an odd function of angle, and hence is either linear or negligible for small angles. Hence the power removed from the incident acoustic beam, from both reflection and parasitic mode conversions, grows quadratically with angle. Limitation of the bevel angle greatly reduces acoustic losses at bevel edges. This applies equally to positive and negative angle bevels.

Figure 6D:
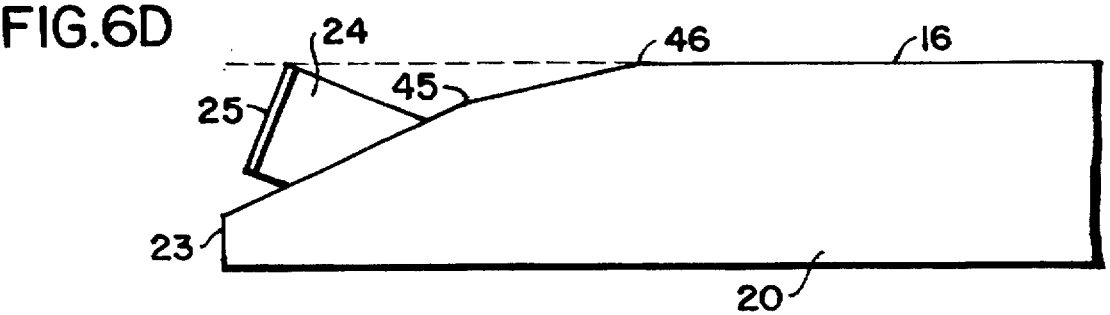

Multiple bevel angles 45, 46 may also be provided in accordance with the present invention, as shown in FIG. 6D. However, when such multiple edges 45, 46 are provided, they are preferably spaced to provide destructive interference of reflected surface bound wave or parasitic modes at the acoustic operating frequency of the sensor design, thereby reducing losses substantially. Because of this interference factor, the total angle for multiple edge 45, 46 structures may differ from that permissible for single edge 11 structures, and in fact a greater acceptable bevel angle may be possible under such circumstances. Such multiple bevel angles with controlled spacing may be formed on glass substrates by grinding, or on metal substrates, e.g., aluminum, by machining, extrusion, and other known metal fabrication techniques.

According to the present invention, a transducer-wedge 20, 21 assembly may extend slightly in front of the substrate surface, causing a so-called "transducer bump". In order to minimize the transducer bump, a lower profile transducer 20', 21' may be employed, which has a smaller height. Therefore, when employing a transducer such as commonly employed in known beveled sensors, see, FIG. 2 of the prior art, a limited angle bevel design as shown in FIG. 6B may result. By reducing the height of the transducer 20', 21', a lower profile transducer system results, as shown in FIG. 6C. By reducing acoustic losses with a limited angle bevel, greater compromises may be made with respect to transducer performance yet achieve adequate performance.

As stated above, where brittle substrates are employed, fracture is a risk, and therefore a minimum aspect ratio of a region near a free edge is preferably maintained to avoid fracture. Example brittle substrates include glass. Thus, knife edges are blunted or avoided. Ductile substrates, on the other hand, have a low fracture risk, and the lateral edges need not be blunted. Example ductile substrates include aluminum and steel. Thus, for brittle substrates such as glass, a minimum substrate thickness of about 0.010 inches, including tolerances is maintained, and more preferably with a minimum 0.020 inch thickness, with the free edges preferably rounded or chamfered with about a 0.005 inch seam.

According to another aspect of the present invention, the substrate need not have a decreasing substrate thickness in the region of the bevel, and, for example, a bent structure may be provided, allowing the substrate to maintain a constant thickness. Such a constant thickness substrate may also be employed to assure sufficient substrate thickness for surface bound waves in cases in which the reflective array is placed on the beveled surface. For example, an aluminum substrate may be provided having a constant thickness bend at the lateral regions, thus allowing flush front mounting with the entire front surface usable.

Advantageously, a beveled edge with substrate thinning may be employed with acoustic plate waves such as Lamb and shear waves. In this case, the bottom surface of the substrate plays a role in confining the acoustic power in a region close to the top surface. Consider again the case in which the reflective arrays are on the beveled surface. While the preferred acoustic modes crossing the bevel edge are surface bound modes, there is little restriction on the nature of the acoustic modes propagating between the transducers and the, perhaps mode converting, reflectors.

The bevel and/or beveled edge may also form part of an acoustically functional structure, for example selectively reflecting or filtering various wave modes, such as parasitics generated at the interface. For example, the mode selectivity of a reflector due to its orientation can be enhanced by increasing the velocity dispersion of undesired higher-order plate-wave modes via the reduced substrate thickness in the region of the reflective array.

Further, in various embodiments, the acoustic properties of the bevel may be advantageously used in forming or tuning the acoustic transducer, to impart or receive acoustic waves from the substrate. In this case, the form, location, and mounting of an electro-acoustic transducing element may be provided so that the system formed by the transducing element, the bevel and the substrate functionally cooperate to provide an efficient and useful acoustic system.

Designs according to the present invention may also find applications with non-flat displays. In particular, such a limited angle bevel may be implemented with a cylindrically curved sensor, for example, to be used with SONY Trinitron ® CRTs.

While the previous embodiments refer to a positive bevel angle, the bevel angle may be negative. That is, the bevel edge may be in the form of concave alteration of the substrate surface. This geometry can also be used to recess transducers for protection from impact damage. The quadratic scaling law for dB loss as a function of angle leads to the conclusion that positive and negative bevel angles of the same magnitude will have similar transmission losses in a single substrate. Accordingly, the acoustic path may cross the negative-bevel interface between the transducers and the arrays.

It should be understood that the preferred embodiments and examples described herein are for illustrative purposes only and are not to be construed as limiting the scope of the present invention, which is properly delineated only in the appended claims.

What is claimed is:

1. An acoustic wave touch sensor comprising:
 a substrate, having a front surface, and a bevel having an edge and an angle with respect to said front surface; and
 an acoustic wave transducer, mounted to said substrate to electrically transduce an acoustic wave, having a wavelength in said substrate,
 said edge having an effective radius which is small as compared to said wavelength and a bevel angle such that a portion of said acoustic wave is attenuated by less than about 3 dB on transmission through a region of said substrate proximate to and crossing said edge.

2. The acoustic sensor according to claim 1, wherein said bevel has an angle less than +25° with respect to said front surface.

3. The acoustic sensor according to claim 1, wherein said bevel has an angle of about +16° with respect to said front surface.

4. The acoustic sensor according to claim 1, wherein said bevel has an angle of between about +6° and +20° with respect to said front surface.

5. The acoustic sensor according to claim 1, wherein said bevel angle is negative.

6. The acoustic sensor according to claim 1, wherein said bevel has a negative angle of magnitude less than 25° with respect to said front surface.

7. The acoustic sensor according to claim 1, wherein said acoustic wave transducer comprises a piezoelectric element mounted on a wedge, said wedge being mounted on said bevel, said acoustic wave being a surface bound acoustic wave.

8. The acoustic sensor according to claim 1, wherein said substrate is formed of glass.

9. The acoustic sensor according to claim 1, wherein said substrate is formed of borosilicate glass.

10. The acoustic sensor according to claim 1, wherein said substrate is a glass sheet having a thickness of about 0.5 inches.

11. The acoustic sensor according to claim 1, wherein said substrate is formed of aluminum.

12. The acoustic sensor according to claim 1, wherein said front surface has a perimeter edge having a length, said bevel being approximately parallel to and adjacent said perimeter edge, having approximately the same length as said perimeter edge.

13. The acoustic sensor according to claim 12, further comprising an electrical wire connected to said acoustic wave transducer, said wire being disposed adjacent to said bevel.

14. The acoustic sensor according to claim 1, wherein said bevel is a positive bevel, said acoustic wave transducer is disposed on said bevel, behind said front surface.

15. The acoustic sensor according to claim 1, wherein said substrate has an outer boundary, said acoustic wave transducer being situated within said outer boundary of said substrate.

16. The acoustic sensor according to claim 1, further comprising a reflective array, said reflective array redirecting portions of said acoustic wave across said front surface.

17. The acoustic sensor according to claim 16, wherein both said reflective array and said acoustic wave transducer are disposed on said bevel, said reflective array redirecting portions of said acoustic wave across said edge to said front surface.

18. The acoustic sensor according to claim 16, wherein said acoustic wave transducer is disposed on said bevel, said reflecting array being disposed on said front surface and redirecting portions of said acoustic wave across said front surface.

19. The acoustic sensor according to claim 16, wherein a touch on said front surface perturbs said acoustic wave, said acoustic wave transducer receiving said perturbed acoustic wave.

20. The acoustic sensor according to claim 1, further comprising a coversheet, parallel to said front surface, fastened proximate to said bevel.

21. The acoustic sensor according to claim 1, wherein said bevel comprises a lateral edge having a substantial thickness with respect to said substrate.

22. The acoustic sensor according to claim 1, further comprising an outer edge surface, said bevel being formed between said outer edge surface and said front surface, said outer edge surface being substantially perpendicular to said front surface.

23. The acoustic sensor according to claim 1, said bevel being a positive bevel, further comprising a lateral wall of said bevel, said lateral wall, with said bevel, forming a trench in said substrate.

24. The acoustic sensor according to claim 1, wherein said acoustic wave transducer comprises an electro-acoustic device mounted on said beveled portion of said substrate, said acoustic wave transducer being for propagating a surface acoustic wave on said front surface.

25. The acoustic sensor according to claim 1, wherein said front surface is non-planar.

26. The acoustic sensor according to claim 1, wherein said substrate comprises a second edge in said region forming a pair of edges including said edge, said pair of edges being spaced from said edge to cause destructive interference of a reflected portion of said acoustic wave from each of said edges, said second edge having an effective radius which is small as compared to said wavelength and each edge having a respective angle such that said acoustic wave is attenuated by less than about 3 dB on transmission across said pair of edges.

27. The acoustic sensor according to claim 1, wherein said substrate comprises a plurality of edges, including said edge, in said region, each of said edges being spaced to produce reflections which sum to effectively destructively interfere, said plurality of edges each having an effective radius which is small as compared to said wavelength and angles such that said acoustic wave is attenuated by less than about 3 dB on transmission across said plurality of edges.

28. The acoustic sensor according to claim 1, wherein said substrate comprises a plurality of edges, a net attenuation of said acoustic wave across said plurality of edges being less than an acoustic loss across an edge having a largest attenuation loss.

29. The acoustic sensor according to claim 1, wherein said acoustic wave, when crossing said region, is a quasi-Rayleigh wave.

30. The acoustic sensor according to claim 1, wherein said acoustic wave, when crossing said region, is a surface bound wave for which the root-mean-square depth of the acoustic power is less than half of the surface bound wave's wavelength.

31. The acoustic sensor according to claim 1, wherein said acoustic wave, when crossing said region, is a surface bound wave whose root-mean-square power-density depth times 25 divided by half the wavelength is less than about the angle of said edge.

32. The acoustic sensor according to claim 31, wherein said surface-bound wave is a Love wave.

33. The acoustic sensor according to claim 1, wherein said substrate is brittle and has an outer boundary adapted to resist fracture.

34. The acoustic sensor according to claim 1, wherein said substrate is brittle and has a minimum thickness of about 0.020 inches.

35. The acoustic sensor according to claim 1, wherein said effective radius of said edge provides causes an abrupt acoustic impedance change of said substrate for said acoustic wave traveling is said substrate in proximity to said edge.

36. The acoustic touch sensor according to claim 1, wherein said edge is associated with phase incoherence in a wave-function overlap integral between an incident portion and a transmitted portion of said acoustic wave.

37. The acoustic touch sensor according to claim 1, wherein said edge forms an acoustic transmission discontinuity for said acoustic wave.

38. The acoustic touch sensor according to claim 1 wherein said edge is unblended.

39. The acoustic touch sensor according to claim 1 wherein said edge forms a sharp angle.

40. The acoustic sensor according to claim 1, wherein said substrate comprises a touch region, said acoustic wave transducer being mounted across said edge from said touch region.

41. The acoustic sensor according to claim 1, wherein said substrate has a thickness which decreases lateral to said edge.

42. The acoustic sensor according to claim 1, wherein said acoustic wave transducer has an acoustic axis which intersects said edge.

43. The acoustic sensor according to claim 1, wherein said acoustic wave transducer has an acoustic axis which does not intersect said edge, further comprising an acoustically reflective array disposed along said acoustic axis.

44. The acoustic sensor according to claim 1, further comprising means for sensing a perturbation of said acoustic wave propagating in said substrate.

45. The acoustic sensor according to claim 1, further comprising an electronic analyzer circuit receiving a signal from said acoustic wave transducer corresponding to an acoustic signal propagating in said substrate.

46. The acoustic sensor according to claim 1, further comprising an electric signal generator exciting said acoustic wave transducer to generate said acoustic wave.

47. The acoustic sensor according to claim 1, wherein:

at least a portion of said acoustic wave intersects said edge, said edge having a bevel angle such that said acoustic wave transducer is displaced from said front surface.

48. An acoustic wave device comprising:

a substrate, having two adjoining mutually inclined surfaces and a boundary therebetween; and an electroacoustic transducer mounted to said substrate on one of said surfaces and being displaced from a plane of said adjoining surface, said electroacoustic transducer interacting with an acoustic wave traveling in said substrate, at least a portion of said acoustic wave having a path in said substrate underlying both of said adjoining surfaces, and being attenuated by less than about 3 dB on transmission across said boundary and being associated with a distinct reflected subportion.

* * * * *